United States Patent [19]
Spevack

[11] 3,907,509
[45]*Sept. 23, 1975

[54] APPARATUS FOR CONCENTRATING BY DUAL TEMPERATURE EXCHANGE

[75] Inventor: Jerome S. Spevack, New Rochelle, N.Y.

[73] Assignee: Deuterium Corporation, White Plains, N.Y.

[ * ] Notice: The portion of the term of this patent subsequent to Apr. 6, 1988, has been disclaimed.

[22] Filed: Mar. 11, 1968

[21] Appl. No.: 712,287

Related U.S. Application Data

[60] Division of Ser. No. 828,926, July 16, 1959, Pat. No. 3,142,540, which is a continuation-in-part of Ser. No. 188,925, Sept. 29, 1950, Pat. No. 2,895,803.

[52] U.S. Cl. .................... 23/270.5; 23/312; 23/204; 423/648
[51] Int. Cl. ... B01d 11/04; C01b 4/00; B01d 11/00
[58] Field of Search .......... 23/309, 310, 270.5, 312, 23/204, 267, 270

[56] References Cited
UNITED STATES PATENTS

| | | | |
|---|---|---|---|
| 2,741,543 | 4/1956 | Urey | 23/312 X |
| 2,787,526 | 4/1957 | Spevack | 23/204 |
| 3,142,540 | 4/1964 | Spevack | 23/312 X |

Primary Examiner—Norman Yudkoff
Assistant Examiner—S. J. Emery
Attorney, Agent, or Firm—Hall & Houghton

[57] ABSTRACT

Dual temperature exchange apparatus, comprising a dual temperature stage having a hot processing tower and a cold processing tower, is provided with means for transferring heat from the hot processed gas to both liquid and gas being delivered to the hot processing tower, preferably a heat exchange system comprising means for effecting direct contact between the hot processed gas and the cold processed liquid being delivered to the hot tower, means for establishing a circulation of the resulting heated processed liquid, and means including an indirect contact exchanger for transferring heat from said circulation to condition the gas being supplied to the hot processing tower.

6 Claims, 2 Drawing Figures

APPARATUS FOR CONCENTRATING BY DUAL TEMPERATURE EXCHANGE

CROSS REFERENCE TO RELATED APPLICATIONS

This application and companion applications Ser. No. 797,191 filed Feb. 6, 1969, a division hereof, are divisions of application Ser. No. 828,926 filed July 16, 1959 and have been filed pursuant to a requirement for restriction entered therein between the inventions claimed therein and in these divisional applications. Said application Ser. No. 828,926 is a continuation in part of copending parent application Ser. No. 188,925 filed Sept. 29, 1950 first disclosing the apparatus inventions claimed herein and in said companion application. Said application Ser. No. 188,925 has matured into U.S. Pat. No. 2,895,803 issued July 21, 1959 and a division thereof has matured into U.S. Pat. No. 3,142,540 issued July 28, 1964. A terminal disclaimer is filed in this application and said companion application so that they will expire co-terminously in the event that either should be issued after the other.

BACKGROUND OF THE INVENTION

1. Field of the Invention

This invention relates to apparatus particularly but not exclusively adapted for the concentration of isotopes by a dual temperature exchange system which involves equilibrium exchange of a desired material between two substances at different temperatures.

2. Description of the Prior Art

In such isotope exchange systems, for instance as disclosed in my application Ser. No. 509,581, filed Nov. 9, 1943, now U.S. Pat. No. 2,787,526, issued Apr. 2, 1957, a single stage system or each stage of a cascade employs a cold tower and a hot tower and the progress of the exchange reactions through the system has required alternate and repeated cooling and heating of the substances involved in a very costly manner. These temperature reversals taken with the humidity variations and loss of costly materials with the waste have constituted the outstanding factors in the operating costs and have been determinative of the practicability of the system.

SUMMARY OF THE INVENTION

A principal object of this invention is to provide improved systems for reducing the heat cost factors in a manner economizing on the energy to be supplied and greatly reducing the cost of operation while at the same time maintaining the rate and quality of output.

This object is attained by the provision of an improved apparatus in which enriched and impoverished first and second fluids, especially gas and liquid, to be processed in contact at elevated temperatures, are adjusted to the contact conditions by transferring thereto heat contained in an enriched hot processed second fluid, while maintaining the enriched hot processed second fluid out of contact with the impoverished second fluid.

Further objects and details of the apparatus will appear from the following specification and accompanying drawings of illustrative embodiments thereof.

DESCRIPTION OF PREFERRED EMBODIMENTS

Figure 1:
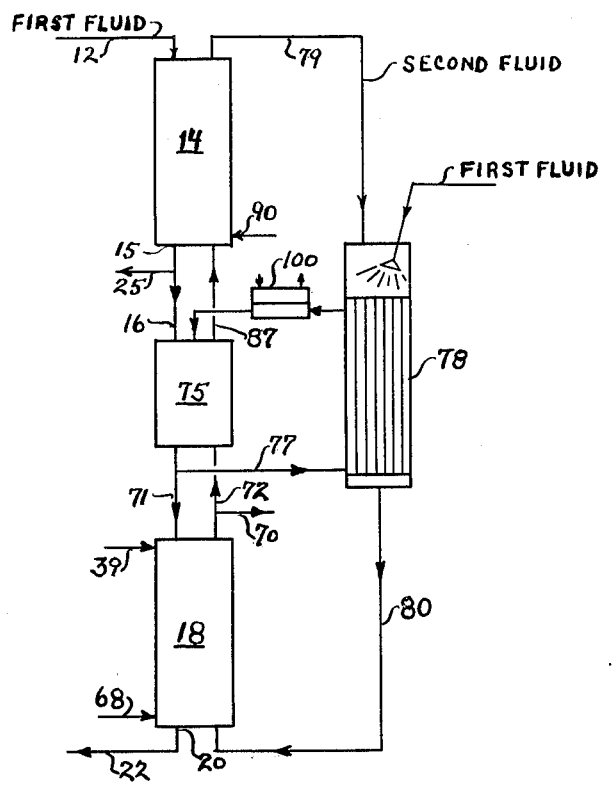
FIG. 1 shows diagrammatically one embodiment of the present invention.

The features of the present invention are typically illustrated in connection with the concentration of deuterium by countercurrent reactions at contrasting high and low temperatures. The reactants in this exemplary embodiment are hydrogen sulfide gas ($H_2S$) and liquid water ($H_2O$).

Both of these substances contain chemically different forms of hydrogen, which are capable of undergoing a reversible exchange reaction. In such a reaction an equilibrium is established between the light and heavy hydrogen isotopes. Since the mechanism of the exchange reaction is ionic, no catalyst is required.

The system at each stage makes use of two towers, a cold temperature tower and a hot temperature tower. The isotopic exchange reactions involved in this illustrative embodiment are:

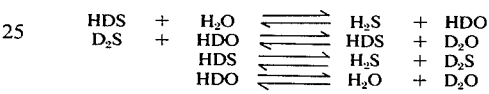

Equilibrium conditions favor concentration of the deuterium in the water phase with a greater concentration effect occurring at the lower temperature. Proper operation of the system gives rise to a concentration gradient in the towers and causes an accumulation, in this illustrative embodiment. of deuterium as heavy water at the bottom of the cold tower.

Feed water enters the system at the top of the cold tower, passes through the cold tower into the top of the hot tower, and leaves as waste from the bottom of the hot tower which waste may in turn be used as the supply to a separate subsequent system. Hydrogen sulfide gas is continuously recycled from the top of the cold tower to the bottom of the hot tower, always flowing countercurrent to the water. Suitable heat exchangers are provided to heat or cool the gas and liquid streams before their entry into the towers.

In each stage the cold tower acts as the concentrating tower. Inasmuch as equilibrium conditions favor the presence of deuterium in the water phase, then as the water stream passes through the cold tower it becomes enriched in deuterium, while the hydrogen sulfide stream becomes depleted. Depletion of deuterium in the gas stream continues to a point where at the top of the cold tower it approaches its equilibrium concentration with the feed water.

The function of the hot tower is the reverse of the cold tower. This tower acts as a deuterium stripper, and thereby provides deuterium reflux to the cold tower. Since the equilibrium constant at the hot tower temperature is not as favorable to deuterium concentration in the water, the water which has passed into the hot tower from the cold tower is obliged to return its excess deuterium to the hydrogen sulfide stream. This redistribution of deuterium from liquid to gas goes on through the entire length of the hot tower and continues to a point where at the bottom of the hot tower the water approaches its equilibrium concentration with the hydrogen sulfide. Therefore, since the quantity of deuterium entering with the hydrogen sulfide at the bottom of the hot tower is essentially the same as that which has left the top of the cold tower, and since the liquid and gas streams tend to approach equilibrium with each other at either end of the system, then the deuterium concentration in the water leaving the hot tower must be less than its concentration in the feed water which enters the cold tower.

By repeated operation, this mechanism causes a growing accumulation of deuterium at the bottom of the cold tower and thereby enables the continuous removal of a concentrated product.

In the arrangement of FIG. 1, pumps and valves are omitted for simplicity and the supply of first fluid, e.g., liquid ($H_2O$), enters the top of the cold tower 14 via conduit 12. As hereinafter explained, there is a countercurrent of second fluid, e.g. gas ($H_2S$), passing upward in this tower 14, the temperature of this cold exchange reactor being maintained at about 20°C., for instance, for a pressure of 5 atmospheres.

The cold liquid discharged at 15 at the bottom of the tower may be divided, at least one portion going by conduit 16 to heating means 75 to be heated therein and passed on to the top of the hot tower 18. In the hot tower there also is a countercurrent of gas for the hot (80° C.) exchange reaction and hot liquid is discharged at 20 at the bottom of the tower and is passed therefrom via conduit 22. The other portion of the cold liquid discharged from the cold tower at 15 passes by conduit 25 from this stage.

No temperature treatment is required for the liquid flow to the cold tower assuming an initial supply at the right temperature, and the liquid supplied to the hot tower is raised in temperature from sources within the system. Additional steam may be drawn upon in connection with stripping of the discharge liquor from hot tower 18 and return of the separated gas to the hot tower 18, whereby the amount of process steam that is still required by the plant to make up for process inefficiencies and to complete the gas heating and humidification as hereinafter explained is thus put to an additional use before it enters the hot tower 18 via 68.

The conditioning of the countercurrent gas (for instance $H_2S$) is attained by this invention with utmost economy. The gas supplied to the cold tower 14 is efficiently cooled and dehumidified and the gas supply to the hot tower 18 is heated and humidified with intercharge of energy between these operations. The hot humidified gases which may be required at a following stage are obtained through piping 70 from the hot gases leaving the hot tower 18 via conduit 72, and hot liquor from a following stage returns by piping 39 to the hot tower 18.

An important aspect of the present system is the recovery and use of the low level energy which is available in the cooling and dehumidification of the hot gases leaving the hot tower to condition these gases for countercurrent use in the cold tower. Instead of cooling these hot gases with cooling water and wasting the heated water, the coolant is in part provided from the liquid passing from the cold tower to the hot tower and in part from a flow of liquid circulated in a cyclic treatment reclaiming the heat and using it for heating and humidification of the gas to the hot tower. In the arrangement illustrated the cold gases are simultaneously heated and humidified while the circulating liquor is cooled. The hot humidified gases are passed by pipe 80 into the hot tower 18. The cooled liquor is recirculated to the dehumidifier and cooler 75 to pick up another charge of energy for delivery to the heater and humidifier 78. Inasmuch as the liquid circulates in a closed cycle 75, 77, 78, 89, there is no adverse effect upon the operation of the system. A small amount of make-up water is continuously added via 21 in order to replace that portion which is consumed in humidification of the gas stream. This may conveniently be drawn from the discharge pipe 22 from hot tower 18 or from the feed pipe 12, etc.

To summarize the foregoing, the system of FIG. 1 makes use of a heat transfer cycle involving the pick-up of energy from a hot humidified gas by a liquid stream in a countercurrent direct contact, gas cooler dehumidifier tower and the subsequent liberation of this energy from the liquid to a cold gas stream by an indirect contact countercurrent heat exchange relation.

In this system the cold tower 14 may be extended to include a section 75 at its bottom (or a separate tower) which will serve as the direct contact gas cooler-dehumidifier. The cold liquid from the bottom of the cold tower 14, together with an auxiliary flow via 87 passes countercurrent in 75 in contact with the hot humidified gas from the top of the hot tower 18 and becomes heated as the gas is cooled to the cold tower temperature. The cooled gas via 87 then flows upward through the cold tower 14. The hot liquid from the bottom of said direct contacting section 75 is divided. A portion 71 represented by the main cold tower stream plus added condensate is sent to the hot tower and the balance 77 is sent to a heat exchanger 78 through which indirectly it transfers its energy to a mixture of the cold tower gas and a volume of liquid, e.g. water, from 21, required for humidification, and thus the cold tower gas outflow 79 is simultaneously heated and humidified, as the liquid in 77 is cooled. To make up for inefficiencies of the heat transfer equipment this liquid is further cooled in 100, as required, before returning it to the same direct contacting section 75 via 89. The cooled gases from hot tower 18 which pass into the bottom of cold tower 14 via 87 may be joined there by cold gases brought from a following stage by pipe 90.

Figure 2:
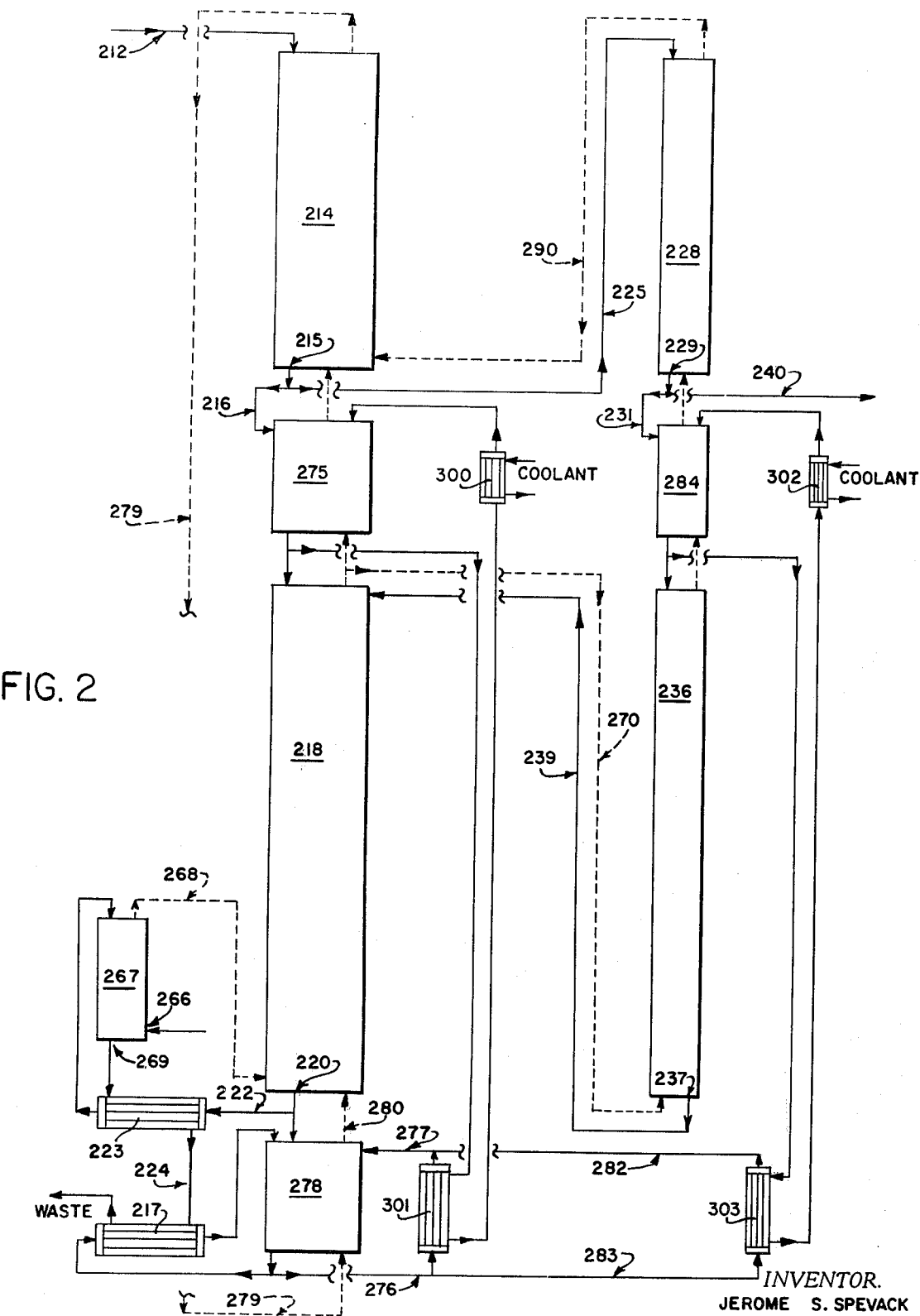
FIG. 2 shows diagrammatically a modified embodiment thereof.

The modified cascade system to which the invention is applied in FIG. 2 is shown with two stages. In general, the handling of the flows and the connections of the reactors and stages are similar to corresponding parts of the systems described in my copending parent application, and where applicable the parts in FIG. 2 are in most instances numbered two hundred above the numbers applied to the corresponding parts in FIG. 1 herein. For simplicity, the pumps and valves have been omitted from FIG. 2 and the liquid stream is in full lines and the gas stream in broken lines. The heat exchange relation between the towers of FIG. 2 employs embodiments of corresponding systems of my copending parent application and incorporates the invention of the system of FIG. 1 herein.

A supply of the hot gases from tower 218 on its way to the cold tower 214 is passed into the bottom of direct-contact gas-cooler dehumidifier 275. Into the top section of said dehumidifier 275 is passed a supply of the cold liquid from tower 214 on its way to the hot tower 218 and also into the top of said dehumidifier 275 there is passed an auxiliary cyclic flow of cold liquid from heat exchangers 300, 301. In the dehumidifier 275 the cold liquid passes countercurrent in contact with the hot humidified gas and becomes heated as the gas is cooled to the cold tower temperature. The cooled gas is passed into the bottom of cold tower 214 and joined there by the cold gases brought from the second stage cold tower 228 by pipe 290. The hot liquid leaving the dehumidifier 275, which now consists of the original cold liquid supply from tower 214 plus the original auxiliary cold liquid supply from heat exchanger circuits 301, 300, 275, plus a supply of condensate which has been formed in the process of cooling and dehumidifying the hot gases from tower 218, is divided. A portion representing the said auxiliary supply is returned to heat exchanger 301 where by an indirect contact heat exchange relation it is cooled and transfers energy for heating and humidifying the cold gases passing via conduit 279 from cold tower 214 to hot tower 218. The remaining portion of hot liquid from said dehumidifier is passed into the hot tower 218 and joined there by the hot liquid passing from hot tower 236 via conduit 239. All of the energy from the dehumidifiers of all the stages in this modification is available for humidification and gas heating in the humidifier 278 of the first stage similar to that described for the system of my copending parent application. The second stage receives hot gas direct to hot tower 236 from the preceding stage via 270 so that a humidifier for the second stage is dispensed with. Similarly, cold tower 228 receives cold liquid from the preceding stage via 225. In the countercurrent contact gas-cooler dehumidifier 284, corresponding to the said dehumidifier 275 of the first stage, the gas passing between the hot tower 236 and cold tower 228 is cooled by cold liquid from the cold tower 228 and a circulation from heat exchangers 302, 303. The supply of cold to heat exchanger 303 is drawn by an indirect contact heat exchange relation similar to the first stage through pipe 283 from the gas heater and humidifier 278, and in turn heat is transferred through pipe 282 back to tower 278 where it joins with the heat transferred from heat exchanger 301 so that the flow of heat energy recovered from the gas cooling and dehumidification from all stages is in circuit with the circulation through humidifier 278 and supplies energy thereto.

Heat exchangers 300 and 302 serve to make up for inefficiencies of the heat transfer equipment and in these exchangers the circulating cold liquid supplied to the dehumidifiers 274 and 284, respectively, is further cooled as required.

The processing of the liquid discharge from 220 of the first stage hot tower in the arrangement shown in FIG. 2 is essentially the same as described for systems of my copending parent application except with regard to the heat energy transferred from the waste discharge flow in the heat exchanger 217. In the system of FIG. 2 a portion of the outflow of cold liquid from humidifier 278 is heated in heat exchanger 217 as the effluent from the stripper heat exchanger 223 is cooled and discharged to waste, and said heated portion is recycled back to the top of humidifier 278 and adds to the heat energy recovered for the heating and humidification of the cold gas passing to the hot tower.

In the system of FIG. 2 the feed is delivered to cold tower 214 through pipe 212 and the enriched stream is withdrawn from the second stage through pipe 240 for further processing. The hot liquid waste from hot tower 218 is treated to recover dissolved gas and heat energy before discharge from the plant. Liquid leaving hot tower 218 via 222 is heated in heat exchanger 223 by the hot liquid discharge from stripper 267. In this exemplary embodiment, steam enters the stripper at 266, passes in direct contact with the heated liquid from 223, leaves via 268 together with a content of the gas stripped from the liquid waste and is passed into the hot tower 218. The gas recycles within the system, passing from cold tower 214 via conduit 279 on its way to heater and humidifier 278 from which it passes into hot tower 218.

The overall process practiced by the illustrative embodiments herein rely on ordinary water as the deuterium source; the gas, hydrogen sulfide, merely acts as an exchange medium and is recycled without being consumed. Make-up gas in small amounts may be supplied preferably at the entrance to the cold tower of the first stage.

The diagrammatic showing and descriptions herein are merely illustrative and descriptive of the plant and process operation and changes in tower height, number of stages, temperature of operation, pressure of operation, the kinds of substances used, the particular isotope to be concentrated, the use of catalysts to enhance rate of isotope exchange, variations of design within a countercurrent temperature exchange and other details may be resorted to within the principle of the invention.

In any system of heat recovery between the fluids entering and either leaving either the hot or cold temperature exchange towers, there may be continuous intimate physical contact only between the fluids entering and leaving, respectively, a single end of the tower. This limitation is necessary to avoid a redistribution of concentrated material from an enriched fluid to a depleted fluid. Accordingly, the system described herein has made use of the very efficient direct intimate contact methods of heat transfer together with the indirect non-contacting methods as required for the systems to which the invention is illustratively applied herein. In the arrangements of FIG. 1 and FIG. 2 the energy available from the gas leaving the hot tower is transferred by direct contact heat exchange to a circulation of liquid, e.g. water, which in turn transfers the energy by at least an indirect contact heat exchange to the gas passing from the cold tower to the hot water and a quantity of the liquid, whereby there is a simultaneous heating of the gas and vaporizing of the liquid in humidification of the gas.

With the systems of this invention the operating conditions for the illustrative embodiments described are readily attained within moderate ranges of the typical values set forth in the following tabulation:

| | | | |
|---|---|---|---|
| Cold Towers temperature | 15° C. | 20° C. | 35° C. |
| Hot Towers temperature | 70° | 80° | 190° |
| Approx. Operating Pressure (absolute) | 25 psi | 80 psi | 275 psi |
| Gas to liquid ratio in cold tower (mols $H_2S$/mols $H_2O$) | 2.21 | 2.20 | 1.8 |
| Concentration of deuterium in product from final stage | 2% | 2% | 2% |
| Concentration of deuterium in feed water | .0143% | .0143% | .0143% |
| Recovery of deuterium from feed water | 12% | 12% | 21% |

The enrichment at which the product may be removed from the system is not dependent on the operating temperatures alone. It is not limited theoretically, but is determined by physical conditions such as the overall contacting efficiency of the countercurrent towers which in turn is dependent upon the efficiency of the individual bubble plates or contacting members within the towers. For bubble plate towers of the standard design generally obtained, approximately 80 plates per tower would be required for conditions set forth above.

The molar ratios of total gas to total liquid passing countercurrent in each stage of hot and cold towers are determined so that the corresponding operating lines intervene between the equilibrium curves as represented by the effective fractionation factors for each of the said towers. The effective fractionation factor in the illustrative embodiment is the equilibrium ratio of the mol or atom fraction of total deuterium in the gas phase and the mol or atom fraction of total deuterium in the liquid phase at a particular temperature and pressure.

In the design of apparatus employing this invention the relative cross-sectional area of each stage is governed by fluid flows in that stage. The number of theoretical plates in a stage is determined by the fluid flow rates, the extraction efficiency, the desired enrichment and the not enriched fluid removal from that stage. In the application employed for illustration, the concentrations existing at the ends of the towers of each stage are calculated by the mathematical solution of deuterium, water and hydrogen sulfide material balances with allowance for the net deuterium transport to each successive stage of an amount equal to the steady state deuterium extraction from the feed water.

The degree of enrichment and the relative size of a stage are based on economic considerations and such factors as hold up and equilibrium time.

In deuterium concentration effected by use of this system there is also a concentration of the tritium and at a better fractionation factor, the principal equilibria being indicated as follows:

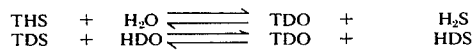

This invention thus provides a practical and highly efficient system for producing a substance (herein exemplified by water) containing a first material (herein exemplified by (D) Deuterium) concentrated therein, by exchanging, at two different temperatures, said first material (exemplified by D) with a second material (exemplified by H) between chemically different fluid substances (exemplified by hydrogen sulfide and water) which are physically separable from each other, and which are each capable of containing each of said materials (D and H). Other examples of such materials and substances are set forth in U.S. Pat. No. 2,787,526 issued Apr. 2, 1957, referred to at the outset of this specification.

To summarize; the apparatus of the present invention, as best shown in FIG. 2, comprises, in combination, a number of cooperating elements, viz:

a. It comprises a pair of exchange units or columns (214,218), each of which has first fluid and second fluid ingress and egress means, exemplified as water and hydrogen sulfide inlet and outlet means, for counter current flow of the two fluids therethrough, the first fluid inlet and outlet means being diagrammatically shown as solid line arrows and those for the second fluid as broken line arrows.

b. It comprises, in each of the units, means such as the above described bubble plates or contacting members, for mixing the two fluids therein to cause an exchange of said materials (e.g. deuterium and hydrogen) between the two fluids (e.g. water and $H_2S$).

c. It further comprises means (e.g. cooler 300) for maintaining the first unit (214) at a temperature to cause the first fluid flowing therethrough (from 212 to 215) to become enriched and the second fluid flowing therethrough (from 250, 290 to 279) to become enriched with respect to said first material (e.g. D), as well as d. means (e.g. that supplying heat via 266,268 and 270) for maintaining the second unit (218) at a temperature to cause the second fluid flowing therethrough (from 270 to 284) to become enriched and the first fluid flowing therethrough (from 215 to 220) to become impoverished with respect to said first material (e.g. D).

e. The combination also includes means (215, 216, 275 to 218) connecting the first fluid egress means of the first unit (214) of the pair to the first fluid ingress means of the second unit (218) of said pair for transferring enriched first fluid from the first unit (214) to the second unit (218) of the pair, as well as f. means (218 to 275 to 215) connecting the second fluid egress means of the second unit (218) of said pair to the second fluid ingress means of the first unit (214) of said pair, and g. means (e.g. 270, or 225) connected to an enriched fluid egress means of said pair of units for withdrawing enriched fluid therefrom.

And the apparatus according to the present invention as shown in FIG. 2, also includes the following cooperating components in the combination:

(h-k). first and second heat exchange means and means interconnecting them in series for establishing a cyclic flow of first fluid therethrough, one of the first and second heat exchange means being a direct contact heat exchange means (one of 275 and 278) and the other comprising an indirect contact heat exchange means (301 together with the other of 275 and 278);

l. the first heat exchange means (h) (e.g. 275, with flow to 301) being connected in circuit with the means (f) by which enriched second fluid is transferred from the second unit to the first unit of the pair of units for effecting heat transfer between said enriched second fluid and said cyclic flow of first fluid therein (the cyclic flow through 301), m. said first heat exchange means (h) (e.g. 275, with flow to 301) also being connected in circuit with the means (e) by which enriched first fluid (from 215) is transferred from the first unit (214) to the second unit (218) of the pair of units, for effecting heat transfer (in 275) between said enriched second fluid (from 218), said enriched first fluid (from 216), and said cyclic flow (from 301) therein, and n. means (280) connected to the second fluid ingress means of the second unit (218) of said pair of units for delivering second fluid thereto, o. said second heat exchange means (278, with flow to 301) being connected in circuit with the means (n), (i.e. between 279 and 280) whereby said cyclic flow (through 301) is brought into heat exchange relation with said second fluid being delivered by said means (n).

In the form of FIG. 1, the first heat exchanger 75 is the direct contact heat exchanger; the second heat exchanger 78 comprises the indirect contact heat exchanger, and the connections therebetween via 77 and 100 establish the cyclic flow. In this form, as shown, first fluid is delivered into the second fluid passing through the exchanger 78, as shown in FIG. 1, to be vaporized thereinto as the second fluid is being heated in 78.

In the form of FIG. 2, the first heat exchanger 275 and the second heat exchanger 278 each comprise a direct contact heat exchanger with a flow to the indirect contact heat exchanger 301, which, with one of said flows, may be considered as comprising part of either the first or second heat exchange means, the other flow being then considered as the cyclic flow interconnecting the two heat exchange means. Herein, first fluid is delivered from source 220 into the flow 276–301 277–278, from which it is vaporized into the second fluid being heated by direct contact in 278.

While there have been described herein what are at present considered preferred embodiments of the invention, modifications and changes and rearrangements may be made therein without departing from the essence of the invention; the exemplary embodiments are to be taken as illustrative and not restrictive of the invention, the scope of which is defined in the appended claims.

I claim:

1. Apparatus for producing a fluid containing a first material concentrated therein by exchanging, at two different temperatures, said first material with a second material between chemically different fluids which are physically separable from each other and which are each capable of containing each of said materials, which apparatus comprises, in combination, (a) a pair of exchange units each of which has first fluid and second fluid ingress and egress means for countercurrent flow of the two fluids therethrough; (b) means in each of said units for mixing said two fluids therein to cause an exchange of the said materials between the two fluids; (c) means for maintaining a first unit of said pair at a temperature to cause the first fluid flowing therethrough to become enriched and the second fluid flowing therethrough to become impoverished with respect to said first material; (d) means for maintaining the second unit of said pair at a temperature to cause the second fluid flowing therethrough to become enriched and the first fluid flowing therethrough to become impoverished with respect to said first material; (e) means connecting the enriched first fluid egress means of the first unit of said pair to the first fluid ingress means of the second unit of said pair for transferring a flow of enriched first fluid from the first unit of said pair to the second unit of said pair; (f) means connecting the enriched second fluid egress means of the second unit of said pair to the second fluid ingress means of the first unit of said pair for transferring a flow of enriched second fluid from the second unit of said pair to the first unit of said pair; (g) means connected to the second fluid ingress means of the second unit of said pair of units for delivering a flow of second fluid thereto; and (h) means connected to an enriched fluid egress means of said pair of units for withdrawing enriched fluid therefrom; said apparatus further comprising the following cooperating components in the combination:

i. a first heat exchange means;

j. a second heat exchange means;

k. said first heat exchange means being a direct contact heat exchange means and said second heat exchange means comprising an indirect contact heat exchange means;

l. means interconnecting said first and second heat exchange means in series for establishing a cyclic flow of liquid first fluid therebetween and comprising means for maintaining said cyclic flow separated from said flows of second fluid except in said direct contact heat exchange means;

m. said first heat exchange means (i) being connected in circuit with the means (f) by which enriched second fluid is transferred from the second unit to the first unit of said pair of units, for effecting heat transfer between said enriched second fluid and said cyclic flow of first fluid therein;

n. said first heat exchange means (i) also being connected in circuit with the means (e) by which enriched first fluid is transferred from the first unit to the second unit of said pair of units, for effecting heat transfer between said enriched second fluid, said enriched first fluid and said cyclic flow of first fluid therein; and o. said second heat exchange means (j) being connected in circuit with the means (g), whereby said cyclic flow is brought into heat exchange relation to the second fluid being delivered by said means (g).

2. Apparatus as claimed in claim 1, wherein p. said first heat exchange means (i) is a direct contact heat exchange means in which the enriched first and second fluids and cyclic flow of first fluid enumerated in (n) are all three commingled.

3. Apparatus as claimed in claim 1, wherein the apparatus is one for handling first and second fluids which are vaporizable liquid and gas, respectively, and which further comprises p. means connected to the second fluid delivery means referred to in (g) for passing thereinto in heat exchange relation to the cyclic flow referred to in (o), a quantity of first fluid in liquid form to be vaporized into the second fluid by the heat derived from said cyclic flow, concurrently with the heating of said second fluid referred to in (o).

4. Apparatus for producing water containing deuterium concentrated therein by exchanging, at two different temperatures, said deuterium with hydrogen between the two physically separable fluids water and hydrogen sulfide, which apparatus comprises, in combination, a. a pair of exchange columns each of which has water and hydrogen sulfide inlet and outlet means for countercurrent flow of said two fluids therethrough;

b. means in each of said columns for mixing said two fluids therein to cause an exchange of the deuterium and hydrogen between the two fluids;

c. means for maintaining a first column of said pair at a temperature to cause the water flowing therethrough to become enriched and the hydrogen sulfide flowing therethrough to become impoverished with respect to deuterium;

d. means for maintaining the second column of said pair at a temperature to cause the hydrogen sulfide flowing therethrough to become enriched and the water flowing therethrough to become impoverished with respect to deuterium;
e. means connecting the deuterium enriched water outlet means of the first column of said pair to the water inlet means of the second column of said pair for transferring a flow of deuterium enriched water from the first column of said pair to the second column of said pair;
f. means connecting the deuterium enriched hydrogen sulfide outlet means of the second column of said pair to the hydrogen sulfide inlet means of the first column of said pair for transferring a flow of deuterium enriched hydrogen sulfide from the second column of said pair to the first column of said pair;
g. means connected to the hydrogen sulfide inlet means of the second column of said pair of columns for delivering a flow of hydrogen sulfide thereto; and
h. means connected to a deuterium enriched fluid outlet means of said pair of columns for withdrawing deuterium enriched fluid therefrom;

said apparatus further comprising the following cooperating components in the combination:
i. a first heat exchange means;
j. a second heat exchange means;
k. said first heat exchange means (i) being a direct contact heat exchange means and said second heat exchange means (j) comprising an indirect contact heat exchange means;
l. means interconnecting said first and second heat exchange means in series for establishing a cyclic flow of liquid water therebetween and comprising means for maintaining said cyclic flow separated from said flows of hydrogen sulfide except in said direct contact heat exchange means;
m. said first heat exchange means (i) being connected in circuit with the means (f) by which enriched hydrogen sulfide is transferred from the second column to the first column of said pair of columns, for effecting heat transfer between said deuterium enriched hydrogen sulfide and said cyclic flow of water therein;
n. said first heat exchange means (i) also being connected in circuit with the means (e) by which enriched water is transferred from the first column to the second column of said pair of columns, for effecting heat transfer between said deuterium enriched hydrogen sulfide, said deuterium enriched water, and said cyclic flow of water therein; and
o. said second heat exchange means (j) being connected in circuit with the means (g), whereby said cyclic flow is brought into heat exchange relation to the hydrogen sulfide being delivered by said means (g).

5. Apparatus as claimed in claim 4, wherein
p. said first heat exchange means (i) is a direct contact heat exchange means in which the enriched water and hydrogen sulfide and cyclic flow of water enumerated in (n) are all three commingled.

6. Apparatus as claimed in claim 4, wherein the apparatus further comprises
p. means connected to the hydrogen sulfide delivery means referred to in (g) for passing thereinto in heat exchange relation to the cyclic flow referred to in (o), a quantity of liquid water to be vaporized into the hydrogen sulfide by the heat derived from said cyclic flow, concurrently with the heating of said hydrogen sulfide referred to in (o).

* * * * *